United States Patent [19]

Decaire et al.

[11] Patent Number: 5,340,490
[45] Date of Patent: Aug. 23, 1994

[54] AZEOTROPE-LIKE COMPOSITIONS OF TRIFLUOROMETHANE AND CARBON DIOXIDE OR HEXAFLUOROETHANE AND CARBON DIOXIDE

[75] Inventors: Barbara R. Decaire, West Amherst; Peter B. Logsdon, North Tonawanda; Earl A. E. Lund, West Seneca; Ian R. Shankland, Williamsville; Rajiv R. Singh, Getzville; David P. Wilson, East Amherst; Raymond H. P. Thomas, Amherst, all of N.Y.

[73] Assignee: AlliedSignal Inc., Morris Township, Morris County, N.J.

[21] Appl. No.: 92,317

[22] Filed: Jul. 14, 1993

[51] Int. Cl.$^5$ .................... A62D 1/00; A62D 1/08; C09K 5/04
[52] U.S. Cl. ..................... 252/67; 62/114; 169/45; 169/46; 252/2; 252/3; 252/8; 252/170; 252/171; 252/605; 252/DIG. 9
[58] Field of Search ............. 252/2, 3, 8, 67, 170, 252/171, 605, DIG. 9; 62/114; 169/45, 46

[56] References Cited

U.S. PATENT DOCUMENTS

| | | | |
|---|---|---|---|
| 2,101,993 | 12/1937 | Fleischer | 62/178 |
| 2,641,579 | 6/1953 | Benning et al. | 252/67 |
| 4,724,679 | 2/1988 | Radermacker | 62/114 |
| 5,040,609 | 8/1991 | Dougherty et al. | 169/45 |
| 5,120,770 | 6/1992 | Doyle et al. | 521/99 |
| 5,141,654 | 8/1992 | Fernandez et al. | 252/8 |
| 5,162,381 | 11/1992 | Richard et al. | 521/89 |
| 5,275,751 | 1/1994 | Decaire et al. | 252/67 |

FOREIGN PATENT DOCUMENTS

| | | |
|---|---|---|
| 4116274 | 11/1992 | Fed. Rep. of Germany . |
| 51-125995 | 11/1976 | Japan . |
| 056029 | 3/1990 | Japan . |
| 5-42230 | 2/1993 | Japan . |

Primary Examiner—Linda Skaling
Attorney, Agent, or Firm—Karen A. Harding; Jay P. Friedenson

[57] ABSTRACT

Azeotrope-like compositions comprising trifluoromethane and carbon dioxide or trifluromethane, hexafluoroethane and carbon dioxide are stable and have utility as refrigerants for heating and cooling as well as fire extinguishing compositions.

20 Claims, No Drawings

AZEOTROPE-LIKE COMPOSITIONS OF TRIFLUOROMETHANE AND CARBON DIOXIDE OR HEXAFLUOROETHANE AND CARBON DIOXIDE

BACKGROUND OF THE INVENTION

This invention relates to azeotrope-like or constant-boiling mixtures of trifluoromethane and carbon dioxide or trifluromethane, hexafluoroethane and carbon dioxide. These mixtures are useful as refrigerants for heating and cooling and also as fire extinguishing compositions.

Fluorocarbon based fluids have found widespread use in industry for refrigeration applications such as air conditioning and heat pump applications. Vapor compression is one form of refrigeration. In its simplest form, vapor compression involves changing the refrigerant from the liquid to the vapor phase through heat absorption at a low pressure and then from the vapor to the liquid phase through heat removal at an elevated pressure.

While the primary purpose of refrigeration is to remove energy at low temperature, the primary purpose of a heat pump is to add energy at higher temperature. Heat pumps are considered reverse cycle systems because for heating, the operation of the condenser is interchanged with that of the refrigeration evaporator.

Certain chlorofluoromethane and chlorofluoroethane derivatives have gained widespread use as refrigerants in applications including air conditioning and heat pump applications owing to their unique combination of chemical and physical properties. The majority of refrigerants utilized in vapor compression systems are either single components fluids or azeotropic mixtures.

Azeotropic or azeotrope-like compositions are desired as refrigerants because they do not fractionate upon boiling. This behavior is desirable because in the previously described vapor compression equipment with which these refrigerants are employed, condensed material is generated in preparation for cooling or for heating purposes. Unless the refrigerant composition exhibits a constant boiling point, i.e. is azeotrope-like, fractionation and segregation will occur upon evaporation and condensation and undesirable refrigerant distribution may act to upset the cooling or heating.

The art is continually seeking new fluorocarbon and hydrofluorocarbon based azeotrope-like mixtures which offer alternatives for refrigeration and heat pump applications. Fluorocarbon and hydrofluorocarbon based azeotrope-like mixtures are of particular interest because they are considered to be environmentally safe substitutes for the presently used fully halogenated chlorofluorocarbons (CFC's) which are suspected of causing environmental problems in connection with the earth's protective ozone layer. R-503 is an azeotropic blend which consists of trifluoromethane (HFC-23) and chlorotrifluoromethane (CFC-13), a fully halogenated chlorofluorocarbon (U.S. Pat. Nos. 2,101,993 and 2,641,579).

Substitute refrigerants must also possess those properties unique to the CFC's refrigerants including similar refrigeration characteristics, chemical stability, low toxicity, non-flammability, and efficiency in-use. The latter characteristic is important in refrigeration and air-conditioning especially where a loss in refrigerant thermodynamic performance or energy efficiency may have secondary environmental impacts through increased fossil fuel usage arising from an increased demand for electrical energy. Furthermore, the ideal CFC refrigerant substitute would not require major engineering changes to conventional vapor compression technology currently used with CFC refrigerants. Mathematical models have substantiated that hydrofluorocarbons, such as trifluoromethane (HFC-23), will not adversely affect atmospheric chemistry, being a negligible contributor to ozone depletion and to green-house global warming in comparison to the fully halogenated species. HFC-23 alone is not useful as a refrigerant because of a reduction in low evaporator temperature capability.

JO-3,255,189-A published Nov. 14, 1991 teaches a refrigerant composition of HFC-23 and n-pentane.

Bromofluoromethane and bromochlorofluoromethane derivatives, particularly bromotrifluoromethane (Halon 1301) and bromochlorodifluoromethane (Halon 1211) have gained widespread use as fire extinguishing agents in enclosed areas such as airplane cabins and computer rooms. However, the use of these materials is being phased out due to their high ozone depletion. Moreover, as Halons are frequently used in areas where humans are present, suitable replacements must also be safe to humans at concentrations necessary to suppress or extinguish fire.

Low or non-ozone depleting hydrochlorofluorocarbons have been disclosed to be suitable replacements for various Halons in fire extinguishing. For example, U.S. Pat. No. 5,040,609 discloses a process for preventing and controlling fires using a composition containing trifluoromethane. $CO_2$ is a common fire extinguishing agent used in household fire extinguishers. However, there remains a need for suitable Halon replacements.

DETAILED DESCRIPTION OF THE INVENTION

We have discovered novel azeotrope-like or constant-boiling compositions comprising trifluoromethane (HFC-23) and carbon dioxide or trifluoromethane, hexafluoroethane (FC-116) and carbon dioxide.

The present binary azeotrope-like compositions consist essentially of about 35 to about 85 weight percent trifluoromethane and about 15 to about 65 weight percent carbon dioxide which have a vapor pressure of about 15 psia (103 kPa) at $-85\pm1°$ C. The present ternary azeotrope-like compositions consist essentially of about 30 to about 43 weight percent trifluoromethane, about 33 to about 43 weight percent hexafluoroethane and about 14 to about 37 weight percent carbon dioxide which have a vapor pressure of about 15 psia at about $-87\pm1°$ C.

The present azeotrope-like compositions are advantageous for the following reasons. Each component is a negligible contributor to ozone depletion. Also, because the present compositions exhibit essentially constant-vapor pressure characteristics as the liquid mixture is evaporated and show relatively minor shifts in composition during evaporation, the compositions are advantageous in a vapor compression cycle as they mimic the performance of a constant-boiling single component or azeotropic mixture refrigerant.

The preferred azeotrope-like compositions are in the following Table. In the Table, the numerical ranges are understood to be prefaced by "about":

| COMPONENTS | PREFERRED RANGE (WT. %) | MORE PREFERRED RANGE (WT. %) | MOST PREFERRED RANGE (WT. %) | VAPOR PRESSURE (PSIA) (kPa) |
|---|---|---|---|---|
| HFC-23 | 35–85 | 40–80 | 50–70 | 15 at |
| $CO_2$ | 15–65 | 20–60 | 30–50 | $-85 \pm 1°C.$ |
| HFC-23 | 30–43 | 33–43 | 36–40 | 15 at |
| FC-116 | 33–43 | 33–43 | 36–40 | $-87 \pm 1°C.$ |
| $CO_2$ | 14–37 | 14–34 | 20–28 | |

Since $CO_2$, FC-116 and HFC-23 are indiviually non-flammable materials, their mixtures in all proportions are likewise non-flammable.

Additional components may be added to the mixture to tailor the properties of the mixture according to the need. For example, in the art, propane has been added to refrigerant compositions to aid oil solubility. Similar materials may be added to the present mixture.

All compositions within the indicated ranges, as well as certain compositions outside the indicated ranges, are azeotrope-like, as defined more particularly below. The term "azeotrope-like composition" as used herein is intended to mean that the composition behaves like an azeotrope, i.e. has constant-boiling characteristics or a tendency not to fractionate upon boiling or evaporation. Thus, in such compositions, the composition of the vapor formed during boiling or evaporation is identical or substantially identical to the original liquid composition. Hence, during boiling or evaporation, the liquid composition, if it changes at all, changes only to a minimal or negligible extent. This is to be contrasted with non-azeotrope-like compositions in which during boiling or evaporation, the liquid composition changes to a substantial degree.

In one process embodiment of the invention, the azeotrope-like compositions of the invention may be used in a method for producing refrigeration which comprises condensing a refrigerant comprising the azeotrope-like compositions and thereafter evaporating the refrigerant in the vicinity of a body to be cooled.

In another process embodiment of the invention, the azeotrope compositions of the invention may be used in a method for producing heating which comprises condensing a refrigerant comprising the azeotrope-like compositions in the vicinity of a body to be heated and thereafter evaporating the refrigerant.

In the fire extinguishing embodiment of the invention, the azeotrope-like compositions may be used to extinguish a fire by releasing an effective amount of the composition in an enclosed area containing the fire. As used herein the term effective amount is an amount which will impart to the modified air a heat capacity per mole of total oxygen present sufficient to suppress or prevent combustion of the flammable, non-self-sustaining materials in the enclosed environment. The minimum heat capacities required to prevent or suppress combustion of a variety of materials are generally known in the art and are disclosed in U.S. Pat. No. 5,141,654, incorporated herein by reference. The fire extinguishing compositions of the present invention may also be directly applied to a fire.

The compositions of the present invention may be released via any method known in the art, such as controlled release into the environment of the enclosed space or propelling from a portable or fixed fire extinguisher. Other methods for releasing or applying the fire extinguishing compositions are well known in the art and need not be repeated here.

The compositions may be controllingly released any time that it appears desirable. For example, the modified air can be continuously released at a level sufficient to prevent the start of a fire in environments where the chance of fire must be kept at an absolute minimum or where the threat of fire is constant. Alternatively, the compositions of the present invention may be released as an emergency measure when a fire develops.

The trifluoromethane, hexafluoroethane and carbon dioxide of the novel azeotrope-like compositions of the invention are known materials and are commercially available. Preferably, the materials should be used in sufficiently high purity so as to avoid the introduction of adverse influences upon the cooling or heating properties or constant-boiling properties of the system.

EXAMPLE 1

This Example shows the azeotrope-like nature of a mixture of trifluoromethane and carbon dioxide. A 50:50 weight percent mixture of HFC-23 and $CO_2$ was charged into a packed distillation column with about 150 theoretical separation stages. The overhead composition of the distillate remained at about 42 weight percent $CO_2$ and about 58 weight percent HFC-23; i.e. these two components could not be separated. Further, the boiling point of the mixture was noted to be about $-85°$ C., which is lower than that of trifluoromethane ($-82°$ C.). Carbon dioxide is a solid at this temperature.

EXAMPLE 2

This Example shows that constant-boiling HFC-23/carbon dioxide blends have certain advantages when compared to other refrigerants which are currently used in certain refrigeration cycles.

The theoretical performance of a refrigerant at specific operating conditions can be estimated from the thermodynamic properties of the refrigerant using standard refrigeration cycle analysis techniques; see for example, R. C. Downing, FLUOROCARBON REFRIGERANTS HANDBOOK, Chapter 3, Prentice-Hall, 1988. The coefficient of performance (COP) is a universally accepted measure, especially useful in representing the relative thermodynamic efficiency of a refrigerant in a specific heating or cooling cycle involving evaporation or condensation of the refrigerant. In refrigeration engineering, this term expresses the ratio of useful refrigeration to the energy applied by the compressor in compressing the vapor. The capacity of a refrigerant represents the volumetric efficiency of the refrigerant. To a compressor engineer, this value expresses the capability of a compressor to pump quantities of heat for a given volumetric flow rate of refrigerant. In other words, given a specific compressor, a refrigerant with a higher capacity will deliver more cooling or heating power.

This type of calculation was performed for a medium to low temperature refrigeration cycle where the condenser temperature is typically −20° F. and the evaporator temperature is typically −120° F. We have further assumed isentropic compression and a superheat of 20° F. (18.3° C.). Such calculations were performed for various combinations of HFC-23 and carbon dioxide as well as for R-503. Table II lists the COP and capacity of the various blends relative to that of R-503. In Table II, "*" means that the COP and capacity are given relative to R-503.

TABLE II

THERMODYNAMIC PERFORMANCE

| Composition HFC-23/carbon dioxide (by weight) | COP* | Capacity* |
|---|---|---|
| 100%/0% | 1.02 | 0.83 |
| 58%/42% | 1.03 | 0.91 |
| 0%/100% | Carbon dioxide is a solid at the operating conditions and cannot act as a refrigerant. | |

As can be seen, the 58 weight percent HFC-23 mixture (azeotrope) has improved refrigeration properties over either HFC-23 or carbon dioxide alone and is a good R-503 alternate.

EXAMPLE 3

This Example shows that the HFC-23/carbon dioxide blends of the invention have utility as fire extinguishing agents.

The fire extinguishing concentrations of $CHF_3$ and $CO_2$ blends are determined by the cup burner method. This method is described in Measurement of Flame-Extinguishing Concentrations, R. Hirst and K. Booth, Fire Technology, Vol. 13, 269–315 (1977). Specifically, an air stream is passed at 40 liters/minute through an outer chimney from a distributor at its base. A fuel cup burner is positioned within the chimney below the top edge of the chimney. The fire extinguishing agent is added to the air stream prior to its entry into the distributor. The air and agent flow rates are measured using calibrated rotameters.

Each test is conducted by adjusting the fuel level in the reservoir to bring the liquid fuel level in the cup burner just even with the ground glass lip on the burner cup. With the air flow rate maintained at 10 liters/minute, the fuel in the cup burner is ignited. The fuels are heptane or methanol. A 50:50 weight percent mixture of HFC-23 and $CO_2$ is added by increments until the flame is extinguished.

EXAMPLE 4

This example shows that a mixture of HFC-23, FC-116 and carbon dioxide form a three component azeotrope, i.e., they can not be separated by distillation and the boiling point of the mixture is lower than the boiling point of the HFC-23/carbon dioxide binary azeotrope (boiling point −85.5° C.) or FC-116 (−78.1° C.).

A mixture of approximately 200 g of 30 weight percent HFC-23, 40 weight percent FC-116 and 30 weight percent $CO_2$ is charged in a low temperature still with approximately 150 theoretical separation stages. The distillation is started at total reflux and at atmospheric pressure. After an hour equilibrium is reached. The refluxing condensate is sampled and analyzed by gas chromatography. The temperature of the condensate is stable at approximately −87° C., lower than that of the binary azeotrope of Example 1 (−85.5° C.). The overhead composition remains constant at approximately 38±5 wt % HFC-23, 38±5 wt % FC-116, with the balance being $CO_2$.

The fact that the boiling point of the ternary is lower than the binary azeotrope or FC-116 establishes that the system is a positive azeotrope. The fact that the ternary cannot be separated into its components, even in a very efficient distillation column, confirms azeotropy.

What is claimed is:

1. Azeotrope-like compositions consisting essentially of
   about 35 to about 85 weight percent trifluoromethane and about 15 to about 65 weight percent carbon dioxide which have a vapor pressure of about 15 psia at about 85° C.±1° C. wherein the azeotrope-like components consist of trifluoromethane and carbon dioxide; or
   about 30 to about 43 weight percent trifluoromethane, about 33 to about 43 weight percent hexafluoroethane and about 24 to about 37 weight percent carbon dioxide which have a vapor pressure of about 15 psia at about −87° C.±1° C. when the azeotrope-like components consist of trifluoromethane, hexafluoroethane and carbon dioxide.

2. The azeotrope-like compositions of claim 1 consisting essentially of about 40 to about 80 weight percent said trifluoromethane and about 60 to about 20 weight percent said carbon dioxide when the azeotrope-like components consist of trifluromethane and carbon dioxide.

3. The azeotrope-like compositions of claim 1 consisting essentially of about 50 to about 70 weight percent said trifluoromethane and about 30 to about 50 weight percent said carbon dioxide when the azeotrope-like components consist of trifluoromethane and carbon dioxide.

4. The azeotrope-like compositions of claim 1 consisting essentially of about 30 to about 43 weight percent said trifluoromethane, about 33 to about 43 hexafluoroethane and about 14 to about 37 weight percent said carbon dioxide when the azeotrope-like components consist of trifluoromethane, hexafluoroethane, and carbon dioxide.

5. The azeotrope-like compositions of claim 1 consisting essentially of about 33 to about 43 weight percent said trifluoromethane, about 33 to about 43 hexafluoroethane and about 14 to about 34 weight percent said carbon dioxide when the azeotrope-like components consist of trifluoromethane, hexafluorothane, and carbon dioxide.

6. The azeotrope-like compositions of claim 1 consisting essentially of about 36 to about 40 weight percent said trifluoromethane, about 36 to about 40 hexafluoroethane and about 20 to about 28 weight percent said carbon dioxide when the azeotrope-like components consist of trifluoromethane, hexafluoroethane, and carbon dioxide.

7. A method for producing refrigeration which comprises condensing a refrigerant consisting essentially of the azeotrope-like compositions of claim 1 and thereafter evaporating said refrigerant in the vicinity of a body to be cooled.

8. A method for producing refrigeration which comprises condensing a refrigerant consisting essentially of the azeotrope-like compositions of claim 2 and thereafter evaporating said refrigerant in the vicinity of a body to be cooled.

9. A method for producing refrigeration which comprises condensing a refrigerant consisting essentially of the azeotrope-like compositions of claim 3 and thereafter evaporating said refrigerant in the vicinity of a body to be cooled.

10. A method for producing refrigeration which comprises condensing a refrigerant consisting essentially of the azeotrope-like compositions of claim 4 and thereafter evaporating said refrigerant in the vicinity of a body to be cooled.

11. A method for producing refrigeration which comprises condensing a refrigerant consisting essentially of the azeotrope-like compositions of claim 5 and thereafter evaporating said refrigerant in the vicinity of a body to be cooled.

12. A method for producing refrigeration which comprises condensing a refrigerant consisting essentially of the azeotrope-like compositions of claim 6 and thereafter evaporating said refrigerant in the vicinity of a body to be cooled.

13. A method for producing heating which comprises condensing a refrigerant consisting essentially of the azeotrope-like compositions of claim 1 in the vicinity of a body to be heated and thereafter evaporating said composition.

14. A method for producing heating which comprises condensing a refrigerant consisting essentially of the azeotrope-like compositions of claim 2 in the vicinity of a body to be heated and thereafter evaporating said composition.

15. A method for producing heating which comprises condensing a refrigerant consisting essentially of the azeotrope-like compositions of claim 3 in the vicinity of a body to be heated and thereafter evaporating said composition.

16. A method for producing heating which comprises condensing a refrigerant consisting essentially of the azeotrope-like compositions of claim 4 in the vicinity of a body to be heated and thereafter evaporating said composition.

17. A method for producing heating which comprises condensing a refrigerant consisting essentially of the azeotrope-like compositions of claim 5 in the vicinity of a body to be heated and thereafter evaporating said composition.

18. A method for extinguishing fire which comprises releasing an amount of the azeotrope-like compositions of claim 1 sufficient to suppress combustion in an enclosed area containing a fire.

19. A method for preventing fire which comprises releasing an amount of the azeotrope-like compositions of claim 1 sufficient to prevent combustion in an enclosed area.

20. A method for extinguishing fire which comprises propelling onto a fire from a portable or fixed fire extinguisher an amount of the azeotrope-like compositions of claim 1 sufficient to suppress combustion.

* * * * *

UNITED STATES PATENT AND TRADEMARK OFFICE
CERTIFICATE OF CORRECTION

PATENT NO. : 5,340,490

DATED : August 23, 1994

INVENTOR(S) : Decaire et al.

It is certified that error appears in the above-identified patent and that said Letters Patent is hereby corrected as shown below:

On the title page, item [54] and col. 1. line 3. before "HEXAFLUOROETHANE" insert --TRIFLUOROMETHANE--.

Claim 1, line 6, delete "85" and insert -- -85°C --.
Column 6:
Claim 1, line 13, delete "when" and insert --wherein--.

Signed and Sealed this

Twenty-second Day of August, 1995

Attest:

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO. : 5,340,490

DATED : Aug. 23, 1994

INVENTOR(S) : Barbara R. Decaire, et al

It is certified that error appears in the above-identified patent and that said Letters Patent is hereby corrected as shown below:

Column 6, line 16, claim 1, "85" should read -- -85° C--

Signed and Sealed this

Twelfth Day of September, 1995

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO.   : 5,340,490

DATED        : August 23, 1994

INVENTOR(S)  : Decaire et al.

It is certified that error appears in the above-identified patent and that said Letters Patent is hereby corrected as shown below:

Column 6, claim 4, line 3, after "43" insert --weight percent--.

Signed and Sealed this

Twenty-seventh Day of August, 1996

Attest:

BRUCE LEHMAN

*Attesting Officer*          *Commissioner of Patents and Trademarks*